July 10, 1962 F. BAUER ET AL 3,043,559
GAS TURBINE
Filed Oct. 11, 1955 3 Sheets-Sheet 1
Fig. 1.
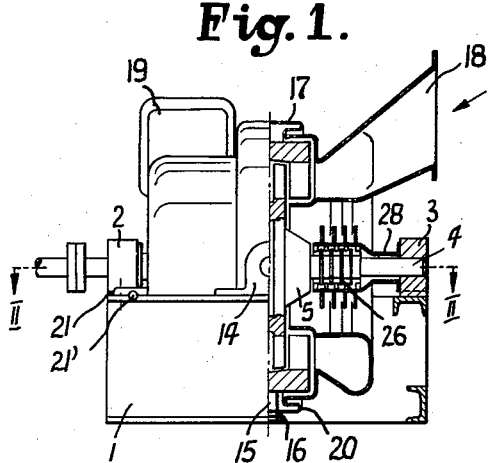
Fig. 2.
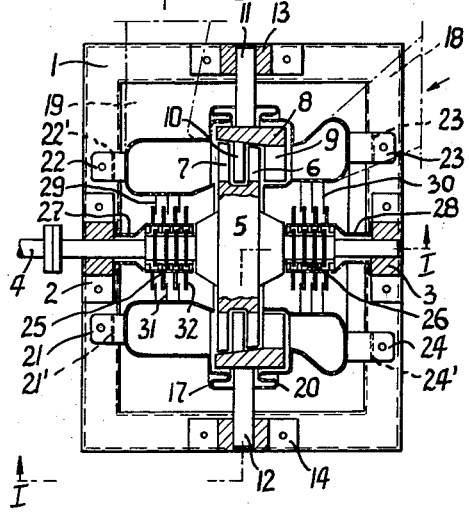
Fig. 4.
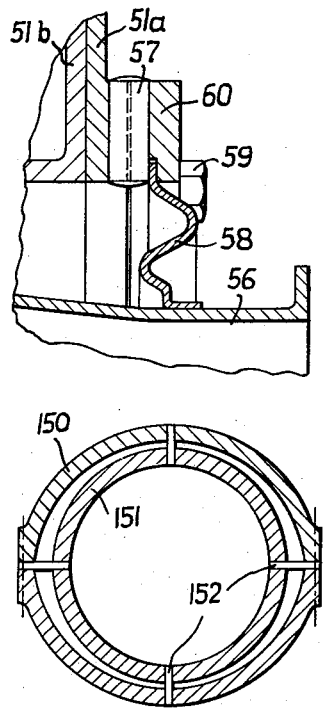
Fig. 3.
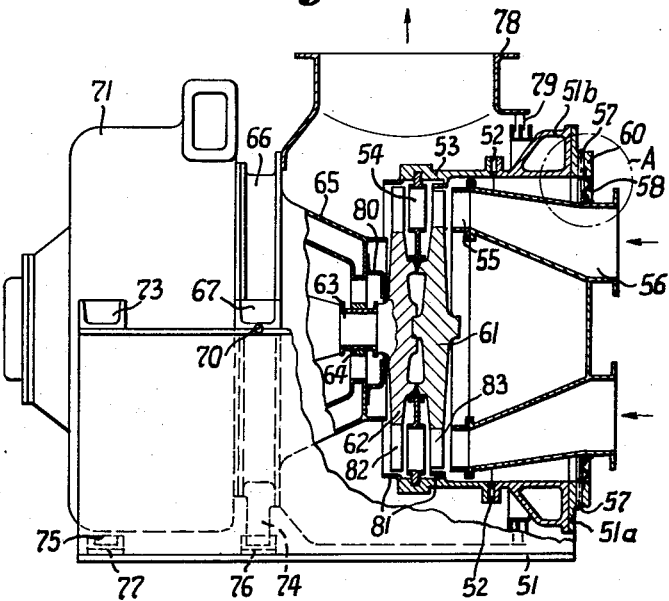
Fig. 11.
INVENTORS
FRITZ BAUER &
CHRISTIAN SCHÖRNER
BY Marechal, Biebel, French & Bugg
ATTORNEYS

INVENTORS
FRITZ BAUER &
CHRISTIAN SCHÖRNER

ATTORNEYS

July 10, 1962  F. BAUER ET AL  3,043,559
GAS TURBINE

Filed Oct. 11, 1955  3 Sheets-Sheet 3

INVENTORS
FRITZ BAUER &
CHRISTIAN SCHÖRNER

BY *Marechal, Biebel, French & Bugg*
ATTORNEYS

United States Patent Office 3,043,559
Patented July 10, 1962

3,043,559
GAS TURBINE
Fritz Bauer and Christian Schörner, Augsburg, Germany, assignors to Maschinenfabrik Augsburg-Nurnberg A.G., Augsburg, Germany, a corporation of Germany
Filed Oct. 11, 1955, Ser. No. 539,876
Claims priority, application Germany Oct. 22, 1954
30 Claims. (Cl. 253—39)

This invention relates to gas turbines and, more particularly, to axial flow turbines adapted for operation at high temperature.

In gas turbines subjected to sustained operation at extremely high temperatures, various parts of the turbine structure are subjected to varying degrees of heat load and thermal stress and, since the various parts of the turbine are differently shaped and of different degrees of massiveness, unequal thermal expansion movement may occur among the various parts with resulting misalignment, damage, leakage, etc. If it is attempted, for example, to provide a turbine housing, including inlet and outlet conduits, which is subdivided or otherwise mounted for free radial and axial movement in all directions, some mitigation of such difficulties may be accomplished. Especially with high speed turbines, however, and considering the stationary parts of the turbine which have a close clearance association with the rotor surfaces, such as guide blades, coverings for the rotor blade tips, shaft packings and bearings, etc., unequal heat expansion movements may still occur when such parts are rigidly mounted on the turbine housing with resultant misalignment or dislocations arising, for example, by reason of heat flow accumulations on irregularly shaped parts, and such misalignments or dislocations may damage the rotor shaft or packings, and produce significant leakage losses, too great running play between the rotor shaft and its associated parts or increased drag on the rotor blades.

According to the present invention, on the contrary, such defects are minimized by providing means for mounting stationary turbine parts in close clearance working association with the rotor independently of the rotor and on a main turbine frame, while other stationary parts such as the turbine housing, etc., not closely associated with the rotor, are also independently mounted on the main frame whereby these several components or categories of components may expand freely in all directions independently of each other and without the heat expansion movements of one interfering with or enforcing heat expansion movements of the others. Such construction according to the invention also permits of a particularly easy and inexpensive mode of construction since the several components are individually mounted on a main turbine frame and since the housing components, particularly, having to support no more than their own weight, can be constructed fairly simply of light weight materials as compared with the more conventional construction whereby most if not all of the turbine parts, stationary or moving, are supported by the main turbine housing. Such construction also includes the provision of resilient though gas-tight packing among the several independently mounted components to maintain a substantially gas-tight housing without rigid interconnection between moving and stationary parts.

It is accordingly a principal object of this invention to provide a gas turbine construction whereby the moving parts, stationary parts associated therewith with close running clearance, and other stationary housing parts of the turbine are each mounted on a rigid frame independently of each other for free heat expansion movement axially and radially.

Another object of this invention is to provide a turbine construction of the character described in which stationary parts associated with the rotor with close running clearance and other stationary parts such as the housings, and the like, are all mounted on a small turbine frame independently of each other but so as to maintain concentricity with the rotor notwithstanding substantial and varying heat expansion movements axially and radially with respect to the rotor.

Still another object of this invention is to provide in a turbine construction of the character described means for individually mounting different turbine parts subject to different thermal conditions separately on a single main frame substantially without rigid interconnection among the parts which would, upon varying heat expansion movement thereof, cause misalignment, interference, or stress among the parts.

A further object of this invention is to provide in a turbine construction of the character described means for mounting stationary parts associated with the rotor with close running clearance directly on a rigid main frame which also carries the rotor mountings and means for mounting housing members also on the same main frame but without rigid interconnection with either the rotor or the close clearance stationary parts.

A still further object of this invention is to provide in a turbine construction of the character described a rigid frame structure adapted to support, as individual components independently mounted, the moving rotor shaft, close clearance stationary parts associated with the rotor, and turbine housing elements to maintain all said parts in substantially coaxial alignment notwithstanding varying degrees and extents of heat expansion movement among the various parts.

Still another object of this invention is to provide in a turbine construction of the character described individually mounted housing and close clearance parts with resilient gas-tight packing means between the housing and other parts of the turbine to insure substantially gas-tight enclosure of the driving medium without rigid interconnection between the housing and differently expanding parts.

Other objects and advantages of this invention will be apparent from the following description, the attached drawings, and the appended claims.

In the drawing—

FIG. 1 is a two-stage axial flow turbine embodying this invention shown partly in vertical section along the line I—I of FIG. 2;

FIG. 2 shows the turbine construction of FIG. 1 in horizontal section along the line II—II of FIG. 1;

FIG. 3 illustrates this invention as applied to a two-stage turbine-compressor combination having an overhung turbine rotor and shown partly in section along the vertical midplane of the turbine rotor;

FIG. 4 is a detail on a larger scale of the portion indicated by "A" in FIG. 3;

FIG. 11 illustrates the construction of a covering ring for the outer tips of turbine blades which do not have an outer shroud ring.

Figure 6:
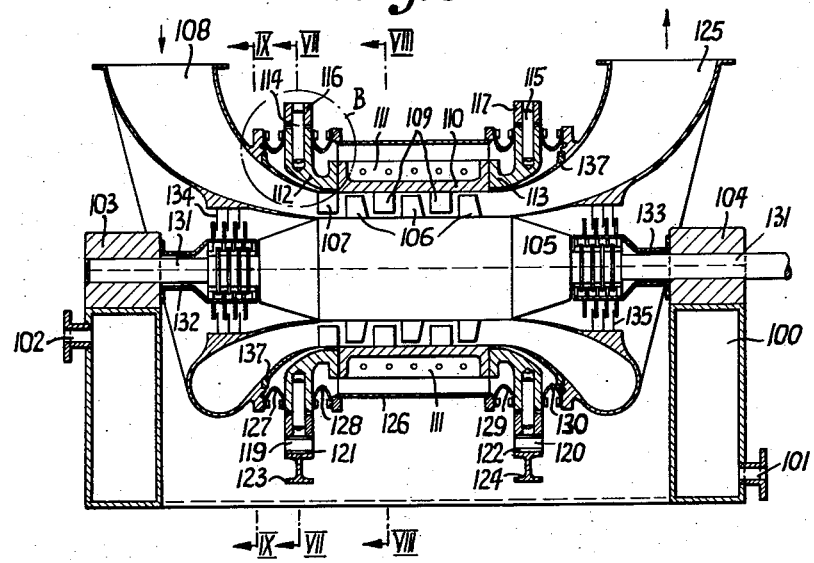
FIG. 6 illustrates the invention as applied to a three-stage axial flow turbine shown in vertical section along the vertical midplane thereof.
Figure 7:
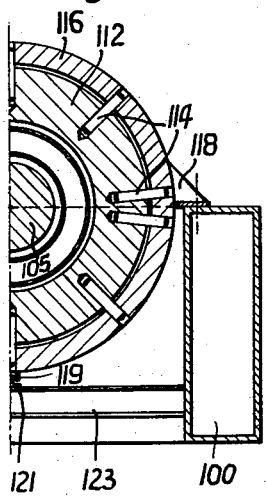
FIG. 7 is a partial vertical section on an enlarged scale along the line VII—VII of FIG. 6.
Figure 8:
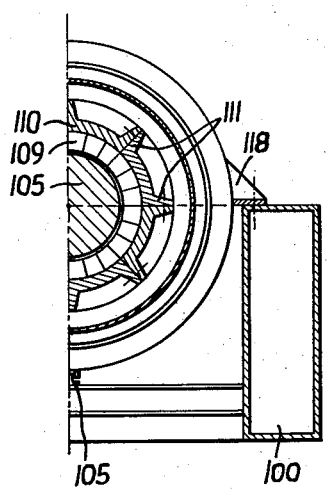
FIG. 8 is a partial vertical section on an enlarged scale along the line VIII—VIII of FIG. 6.
Figure 9:
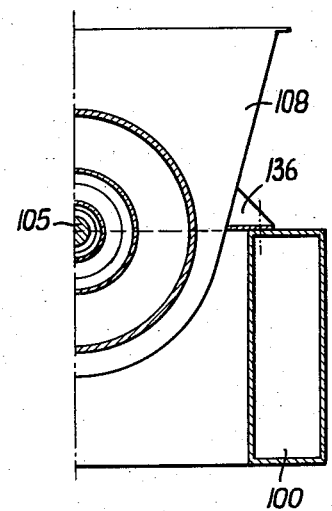
FIG. 9 is a partial vertical section on an enlarged scale along the line IX—IX of FIG. 6.

Referring to the drawings, in which like reference characters indicate like parts throughout the several views thereof, FIGS. 1 and 2 illustrate this invention as applied to a two-stage axial flow turbine having a rigid main frame for carrying journals or pillow block bearings 2 and 3 rotatably mounting the turbine shaft 4. Shaft 4 carries secured thereto rotor 5 which has around the outer periphery thereof two rows of blades 6 and 7. A stator ring 8 carrying stator or guide blades 9 and 10 is mounted coaxially around rotor 5 and shaft 4 thereof. Stator ring 8 is supported in its horizontal midplane by two shafts 11 and 12 received in supporting bearings 13 and 14 mounted on main frame 1. At the bottom of stator ring 8 is a guide 15, which is slidably received in a guideway 16 in the vertical midplane of the turbine for guiding stator ring 8 during heat expansion movements thereof to maintain coaxial alignment between ring 8 and rotor shaft 4.

The turbine housing is indicated generally by 17 and includes an inlet conduit 18 and an outlet conduit 19 for conducting the driving gas to and from the rotor 5. That portion of the housing 17 adjacent the periphery of rotor 5 and guide ring 8 is formed, as indicated at 20, in a corrugated fashion to provide resiliency for compensating for axial expansion movement. Housing 17 is provided with lugs 21, 22, 23, and 24 by means of which it is mounted on main frame 1 independently of the mountings on frame 1 of either guide ring 8 or rotor shaft 4. At each of the lugs 21–24 are provided transversely directed guide pins 21', 22', 23' and 24' for providing guiding of housing with respect to main frame 1 during radial heat expansion movements of the housings.

Gas-tight packings are provided around rotor shaft 4 in the form of labyrinth packings indicated at 25 and 26, and are enclosed within packing sockets 27 and 28 which are mounted on the shaft bearings 2 and 3 respectively and independently of either housing 17 or the other stationary parts associated with the rotor. The space between housing 17 and packing sockets 27 and 28 is made gas-tight to complete the enclosure of the mechanism by the housing by means of lamellar packings 29 and 30 each comprising three flexible sheet metal rings 31 mounted on housing 17 and four smaller rings 32 mounted on packing sockets 27 and 28. Upon the occurrence of gas pressure within the turbine, the flexible rings 31 are forced outwardly against rings 32 to form a gas-tight seal retaining the gas within housing 17 while providing for free radial and axial relative heat expansion movements between housing 17 and packing sockets 27 and 28. Thus, a complete enclosure of the turbine structure is obtained without rigid interconnection adjacent rotor 5 between the housing 17 and the means for mounting rotor shaft 4.

It will be noted that, according to the foregoing description, the turbine shown in FIG. 1 has been designated as having several different categories of components each of which may be subjected to varying thermal conditions and varying extents or degrees of thermal expansion movement. For example, there are the moving parts such as the rotor 5 and its shaft 4. In a second category are the parts such as stator ring 8 and guide blade grids 9 and 10 which are associated with the rotor with relatively close running clearances therebetween. Such parts are referred to herein as "close clearance components" to signify their working association with the rotor as well as the fact that clearances between such stationary parts and the rotor are quite important in the over-all operation of the turbine as is the maintaining of such clearances within relatively narrow limits despite relative, sometimes reciprocal, and frequently varying extents of thermal expansion movement therein. A third category of components includes such parts as housing 17, inlet 18, outlet 19, etc., which stationary parts are generally designated herein as "housing components" and are not associated with any particularly close running clearance relationship with the rotor.

Thus it will be noted that these three categories of parts—i.e., moving parts, close clearance stationary parts, and housing components—are each individually mounted on main frame 1 independently of the others so that each of these three categories of components is free to undergo expansion movements either radially or axially without such movements effecting, interfering with, or enforcing similar though varying movements of either of the other two categories of components, and since each of these components is mounted on the rigid frame 1 closely adjacent the horizontal plane of the rotor axis, coaxial alignment of these several categories is maintained notwithstanding varying heat expansion movements of the parts and without rigid interconnection of one of these categories of components with those in another category.

Figure 5:
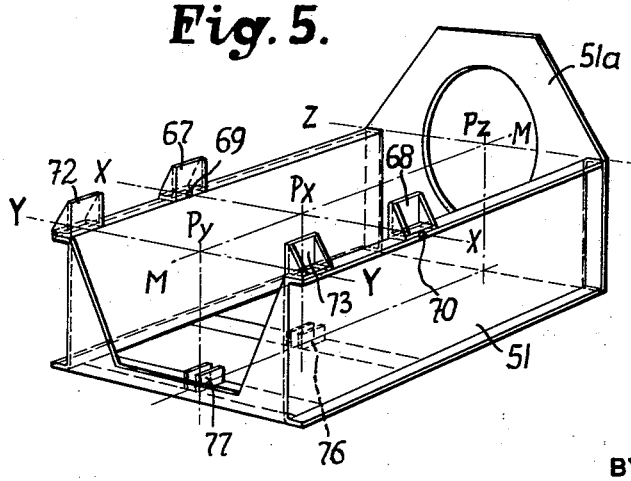
FIG. 5 is a perspective representation of the main frame of the turbine construction of FIG. 3.

Referring to FIGS. 3–5, a structure embodying the invention is illustrated as applied to a turbine-compressor combination such as is adapted for use as an exhaust driven supercharger with, for example, an internal combustion engine. The main frame 51 includes a rigid wall 51a to which is affixed a water-cooled cooling ring 51b. To one side of the cooling ring 51b is attached a cylindrical member 53 by means of four radially directed bolts 52. Cylindrical member 53 serves as a carrier or supporting ring for the stator ring blading 54 for the second pressure stage of the turbine, as well as the cover bands 81 for the outer tips of the turbine blades 82, here shown as not having shroud rings affixed thereto. The stator ring blading 55 for the first pressure stage of the turbine is attached integrally to the inlet conduit 56, and conduit 56 is mounted for sliding expansion movement on radially directed pins 57 by means of yielding sheet metal clips 58 held by flange ring 60 fastened to wall 51a by bolts 59, as indicated in more detail in FIG. 4.

As indicated in FIG. 3 the turbine rotor is of the overhung type and comprises two substantially similar wheels 61 and 62 welded together and mounted on shaft 63. Around the periphery of wheels 61 and 62 are carried the two sets of blades 82 and 83 for the two pressure stages of the turbine. Shaft 63 is mounted in bearing 64 which is carried by a double walled conical mounting 65 the base of which is mounted on a supporting ring 66 which in turn is mounted directly on the frame 51 by means of lugs 67 and 68 disposed in the horizontal plane of the axis of shaft 63. Two pins 69 and 70 serve to guide ring 66 through lugs 67 and 68 during heat expansion movements thereof. Also mounted on ring 66 is the blower or compressor 71 driven by the turbine, and compressor 71 is also carried directly on frame 51 by means of lugs 72 and 73 arranged coplanar with lugs 67 and 68 for maintaining coaxial alignment of turbine and compressor. The bottom of ring 66 and compressor 71 carry guides 74 and 75 respectively slideably engaging guideways 76 and 77 for guiding ring 66 and the housing of compressor 71 during axial heat expansion movement. One side of outlet conduit 78 of the turbine is also carried on ring 66, and resilient lamellar packing members 79 form a nonrigid expansion-compensating closure between the opposite side of outlet housing 78 and cooling ring 51b. A packing cover or ring 80 is attached to the small end of conical member 65 to protect bearing 64 from the direct effect of heat, etc.

As indicated more particularly in FIG. 5, the foregoing construction includes a number of specific geometrical interrelationships of the various parts for the purpose of maintaining the several categories of components aligned notwithstanding varying heat expansion movements therebetween, as previously noted in connection with FIG. 1. For example, the various parts are all mounted on frame 51 with predetermined interrelationship of supporting surfaces, guiding directions, and fastening flanges arranged on a common basis. As noted in FIG. 5, the rotor axis is indicated by the line M—M, while the turbine carrying lugs 67 and 68 and their corresponding guiding pins 69 and 70 lie on a horizontal line X—X. The compressor carrying lugs 72 and 73 are arranged in the same horizontal plane as lugs 67 and 68 and lie on a line Y—Y, while a third parallel line Z—Z is indicated in the same horizontal plane and also in the plane of the end wall 51a. Perpendicularly beneath the points Px and Py, the intersections of M—M with X—X and Y—Y respectively, lie the guideways 76 and 77 for accommodating axial heat expansion movement. Accordingly, in the construction shown in FIGS. 3–5, there are two fixed mounting points for the rotating parts, namely, Px and Py, while the various stationary components are mounted around another fixed point, Pz, aligned and coplanar with Px and Py.

Here again it will be noted that the close clearance stationary parts such as the coverings 81 and the stator blading 54, etc., are mounted directly on end wall 51a of main frame 51 independently of the mounting for rotor shaft 63 or compressor 71 for free axial and radial expansion with respect thereto, as are the guide blades 55 for the first pressure stage, while housing components such as the outlet housing 78 are rigidly affixed to supporting ring 66 with lamellar packing 79 providing a nonrigid seal between outlet housing 78 and the close clearance component mounting to compensate for varying or relative heat expansion movements therebetween.

FIGS. 6–10 illustrate a construction embodying the invention as applied to a three-stage axial flow turbine having a bilateral mounting and a cooled main frame. In this view the main frame 100 is formed with hollow continuous coolant circulation channels having coolant inlet 101 and outlet 102 for the circulation therethrough of coolant, such as water, oil and the like. Main frame 100 carries at either side thereof bearings 103 and 104 in which the shaft of rotor 105 is mounted, and rotor 105 carries around the periphery thereof the blades 106 of the three-stage turbine. The stationary guide blades 107 of the first pressure stage are mounted across the outlet of inlet conduit 108, while the stationary guide or stator blading 109 of the second and third pressure stages are mounted on a stator ring 110 which comprises eight segments affixed together by bolts through flanges 111 as shown in more detail in FIG. 8. This construction of a segmented stator ring 180 is advantageous if the guide blade grid is to be inspected and tested from time to time, which inspection and testing is facilitated by such provision of a plurality of separate segments forming the cylindrical stator ring 110. Alternatively, and particularly in turbine guide having a segmented rotor construction, the blades themselves may be secured to a one-piece stator ring mounted within a segmented stator ring carrier such as 110.

The stator ring 110 is affixed at its ends to two rings 112 and 113 in order to maintain uniform radial heat expansion movement of the individual segments of stator ring 110. Rings 112 and 113 are connected by eight radially disposed pins 114 and 115 to outer mounting rings 116 and 117 with the inner diameter of outer rings 116 and 117 being sufficiently large to admit of radial heat expansion of rings 112 and 113 slideably engaged by pins 114 and 115. Outer mounting rings 116 and 117 are mounted directly on frame 100 by means of lugs 118 disposed in the horizontal plane of the axis of rotor 105, with one of the rings 116 or 117 preferably being axially displaceable with respect to frame 100, and at the bottom of each of mounting rings 116 and 117 in the vertical plane of the axis of rotor 105 are guides 119 and 120 slidably received in guideways 121 and 122 carried on transverse members 123 and 124 for the purpose of guiding rings 116 and 117 to maintain coaxial alignment thereof.

Figure 10:
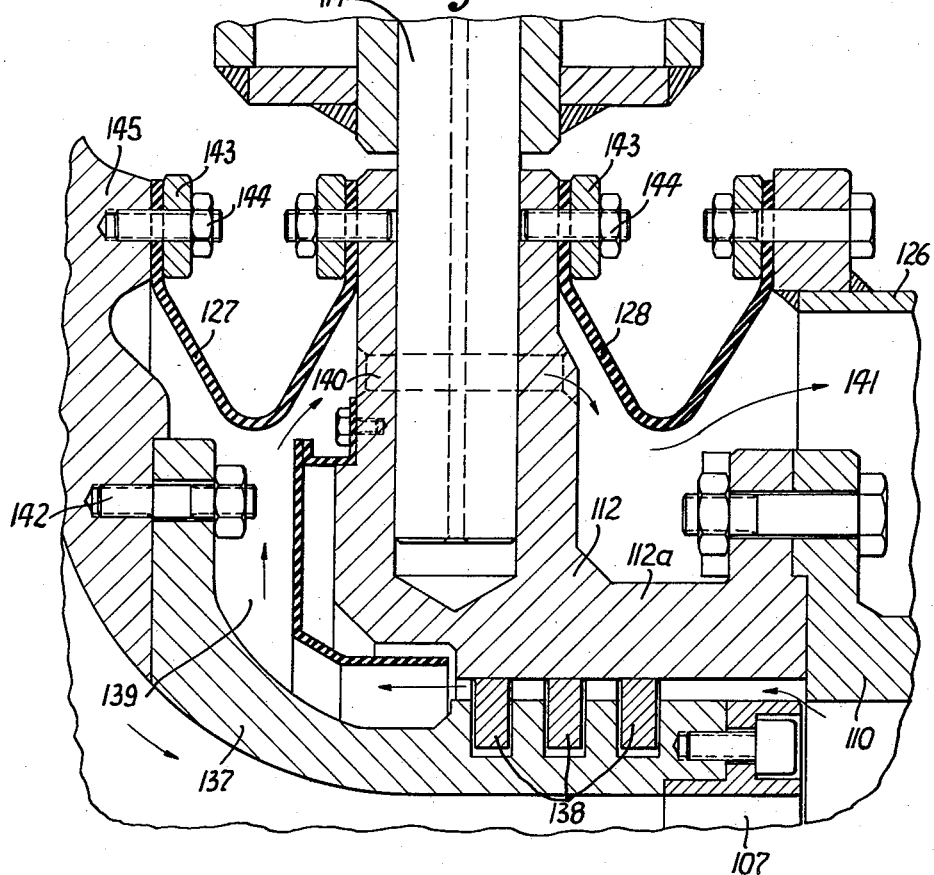
FIG. 10 is a fragmentary view on an enlarged scale of the portion of FIG. 6 indicated by "B"

The inlet 108 and outlet 125 housing components are carried directly on frame 100 by lugs 136, although they join rings 112 and 113 with an expansion-compensating joint for free expansion movement independent of the close clearance components such as the stator ring 110, etc., as appears in more detail in FIG. 10. It will be noted that the inlet 108 and outlet 125 housing components as well as a central cylindrical housing 126 are resiliently connected to rings 112 and 113 by means of yielding V-shaped sheet metal rings 127, 128, 129, and 130, affixed by rings 143 and bolts 144, to complete the gas enclosing housing without rigid interconnection between housing components and close clearance components at a point where relative heat expansion movements therebetween might cause misalignment, interference, or stress.

The complete enclosure by the housing components also includes labyrinth packings around shaft 131 which carries rotor 105, and enclosed in packing sockets 132 and 133 in the manner of the construction shown in FIGS. 1 and 2, with resilient sheet metal rings 134 and 135 forming a gas-tight lamellar closure between the packing sockets 132, 133 and the housing components 108, 125 without rigid connection therebetween in the manner previously described.

One means of nonrigidly joining the housing components 108 and 125 to the rings 112 and 113 for expansion-compensating association is illustrated in FIG. 10. Although only one end of the turbine including inlet 108 is shown, it will be understood that a similar construction has application to the opposite end including outlet 125. A flange ring 137 is shown bolted to bracket 145 at one side of inlet 108 by bolts 142, and extends into a cylindrical extension 112a on ring 112. Three piston rings 138 are arranged around the cylindrical portion of flange ring 137 within the cylindrical extension 112a, and piston rings 138 are so adjusted in their retaining grooves of flange ring 137 that a certain small quantity of driving gas can escape from the working part of the turbine between the rotor 105 and the stator ring 110 to leak past piston rings 138 as indicated by the arrows and flow through space 139, a hole 140 bored through ring 112, into the space 141 between the stator ring 110 and the central housing 126 for the purpose of heating the outside of the stator ring 110 somewhat to equalize thermal stresses in that part of the turbine. It will be noted that this escaping gas is still retained within the housing components by the V-shaped rings 127 and 128 resiliently interconnecting inlet 108 and central housing 126 respectively with ring 112.

When a turbine rotor of the type illustrated is used not having an outer shroud ring at the outer tips of the blades, the stationary blade cover within which the blades move is among the close clearance components to which this invention is directed. One such cover ring or band is illustrated in FIG. 11 as comprising a two-part ring 150 which may be integral with a stator ring carrier such as 110 and is divided through the horizontal midplane thereof, and a closed blade cover ring 151. Both rings are provided with a plurality of aligned radial borings in which pins 152 are slidably inserted to maintain concentricity of the cover ring 151 under varying conditions of operation including heat expansion movements of the various parts of the turbine. Assembly of such a structure is facilitated if the ring 152 is placed over the turbine rotor and inserted into the turbine therewith while, thereafter, the ring 150 is assembled along with the guide blades or stator rings and the guide pins 152 set into position.

Figure 12:
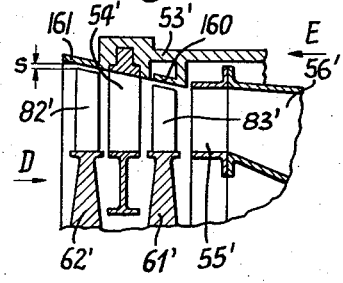
FIG. 12 is a fragmentary view on an enlarged scale illustrating a modification of the blade grid of the turbine of FIG. 3.

One modification of the structure shown, for example, in FIG. 3 is illustrated in FIG. 12. It will be noted that the stator ring carrier 53′ on which the stator or guide blades 54′ are mounted, corresponds to the part designated as 53 in FIG. 3, and is mounted in similar manner on cooled ring 51b. Instead of being cylindrical as with the blade covers 81 in FIG. 3, the blade covers 160 and 161 in FIG. 12 have a conical configuration with the right-hand end of cover ring 160 substantially aligned with the top of the guide blade 55' for the first pressure stage mounted in the inlet conduit 56'. Also, the turbine blades 82' and 83', mounted on rotors 61' and 62', are beveled at their outer ends to correspond with the conical incline of cover rings 160 and 161. With such a construction, and in view of the fixed points Px and Pz previously described in connection with FIG. 5, axial heat expansion movements of the rotors 61' and 62' and the rotor shaft or bearings thereof will cause axial shifting of the blades 82' and 83' in the direction indicated by the arrow D in FIG. 12, while similar axial heat expansion movements of the close clearance components mounted on front wall 51a and/or cooled ring 51b will cause axial shifting of ring 53' in the direction of the arrow E, thereby reducing in size the dimension S between the outer tips of the blades 82' and 83' and their respective cover rings 160 and 161 under high operating temperatures.

It will accordingly be seen that a construction embodying this invention provides simple and inexpensive means for mounting the moving parts of a gas turbine as well as each of the categories of housing components and close clearance components on a turbine main frame so that these several categories of components, being subjected to different thermal conditions and effects, are free to undergo heat expansion movement individually and independently of each other while being firmly mounted, nevertheless, on the main turbine frame, and that the various points where the several categories of components must meet are arranged with resilient expansion-compensating closures instead of rigid interconnections among the parts.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an axial flow gas turbine adapted for high temperature operation free of thermally induced interference and misalignment of moving and stationary components therein, the combination which comprises a main frame for said turbine, a bladed rotor, means for rotatably mounting said rotor on said frame, stationary guiding means for guiding the flow of driving gas about said rotor and adapted for close clearance working association therewith, a housing for said rotor and said stationary guiding means, means for mounting said housing on said main frame, and means for mounting said stationary guiding means on said main frame separately from said rotor mounting means and said housing mounting means for radial and axial expansion movement independently thereof.

2. An axial flow gas turbine of the character described adapted for high temperature operation and comprising a main frame, a bladed rotor, means for rotatably mounting said rotor on said main frame, stationary guiding means for guiding the flow of driving gas about said rotor and adapted for close clearance working association therewith, means for mounting said stationary guiding means on said main frame separately from said rotor mounting means for radial and axial expansion movement independently of said rotor mounting means, a housing for said rotor and said stationary guiding means, and means for mounting said housing on said main frame for radial and axial expansion movement independently of said rotor mounting means and said stationary guiding means.

3. An axial flow gas turbine of the character described adapted for high temperature operation and comprising a main frame, a bladed rotor, means for rotatably mounting said rotor on said main frame, stationary guiding means for guiding the flow of driving gas about said rotor and adapted for close clearance working association therewith, means for mounting said stationary guiding means on said main frame separately from said rotor mounting means for radial and axial expansion movement independently of said rotor mounting means, a housing for said rotor and said stationary guiding means, means for mounting said housing on said main frame for radial and axial expansion movement separately from said rotor mounting means and said stationary guiding means, said main frame being outside said housing, and resilient expansion-compensating packing means on said housing for confining driving gas therein notwithstanding relative heat expansion movements among said housing, said stationary guiding means, and said rotor mounting means.

4. An axial flow gas turbine of the character described adapted for high temperature operation and comprising a main frame, a bladed rotor, means for rotatably mounting said rotor on said main frame, stationary guiding means for guiding the flow of driving gas about said rotor and adapted for close clearance working association therewith, means for mounting said stationary guiding means on said main frame separately from said rotor mounting means and coaxially with said rotor for radial and axial expansion movement independently of said rotor mounting means, a housing for said rotor and said stationary guiding means and including inlet and outlet conduits for said driving gas, means for mounting said housing on said main frame for radial and axial expansion movement independently of said rotor mounting means and said stationary guiding means, said main frame being outside said housing, interfitting expansion-compensating packing means on said housing for confining driving gas therein notwithstanding relative heat expansion movements among said housing, said stationary guiding means, and said rotor mounting, and guides on said main frame for guiding said stationary guiding means and said housing coaxially with said rotor during radial and axial expansion movements thereof.

5. In an axial flow gas turbine adapted for high temperature operation free of thermally induced interference and misalignment of moving and stationary components therein, the combination which comprises a main frame for said turbine, a bladed turbine rotor journaled on said frame, a stator ring adapted for close clearance working associated with said rotor, means for mounting said stator ring on said frame coaxially around said rotor and independently of said rotor journals for free radial expansion movement with respect to said rotor, a housing for said rotor and said stator ring, means for mounting said housing on said frame for free radial and axial expansion movement with respect to said rotor and independently of expansion movements of said rotor and said stator ring, interfitting telescoping packing means on said housing and said rotor journals resiliently enclosing said rotor in said housing notwithstanding expansion movements therebetween, and guide means on said frame for guiding said housing during radial and axial expansion movements.

6. In an axial flow gas turbine adapted for high temperature operation and having a bladed rotor, stationary guiding components for close clearance working association with said rotor, and a housing for said stationary guiding components and said rotor, the combination which comprises a main frame for said turbine, means for rotatably mounting said rotor on said main frame, means for mounting said stationary guiding components on said main frame separately from said rotor mounting means and coaxially about said rotor for free expansion movement with respect thereto, means for mounting said housing on said main frame separately from said rotor mounting means and said stationary guiding components for free expansion movement of said housing with respect thereto, expansion-compensating packing means between said rotor mounting means and said housing for resiliently enclosing said rotor within said housing notwithstanding relative heat expansion movements therebetween.

7. An axial flow gas turbine according to claim 6 in which said expansion-compensating packing means between said rotor mounting means and said housing includes a plurality of lamellar packing rings mounted on said rotor mounting means and a plurality of resilient packing rings on said housing interfitting with said rings on said rotor mounting to provide a telescoping, nonrigid, gas tight closure between said rotor mounting means and said housing.

8. An axial flow gas turbine according to claim 6 in which said means for mounting said stationary guiding components on said main frame includes bearing means on said main frame disposed at diametrically opposite sides of said rotor and shaft means on said stationary guiding components slidably engaging said bearing means for compensating for radial expansion movements of said stationary guiding components.

9. In an axial flow gas turbine adapted for high temperature operation free of thermally induced interference and misalignment of moving and stationary components therein, the combination which comprises a main frame for said turbine, a bladed turbine rotor, a supporting ring for said rotor, means for rotatably mounting said rotor on said supporting ring, means for mounting said supporting ring on said main frame, a plurality of stationary guiding components for close clearance working association with said rotor, means for mounting said stationary guiding components on said main frame separately from said supporting ring and coaxially with said rotor for axial and radial expansion movement with respect thereto, a housing for said rotor and said stationary guiding means, and means for mounting said housing on said main frame for radial and axial expansion movement independently of said rotor mounting means and said stationary guide means.

10. An axial flow gas turbine according to claim 9 in which said means for mounting said supporting ring on said main frame is disposed substantially in the horizontal plane of the axis of said turbine rotor.

11. An axial flow gas turbine according to claim 9 in which said means for mounting said supporting ring on said main frame includes guide means on said frame for guiding said supporting ring during radial and axial expansion movements thereof to maintain said ring coaxially aligned with said stationary guiding components.

12. An axial flow gas turbine according to claim 9 in which said means for mounting said stationary guiding components on said main frame includes an end wall on said main frame for supporting said components and axially spaced from said means for mounting said supporting ring on said main frame.

13. An axial flow gas turbine according to claim 9 in which said means for mounting said stationary guiding components on said main frame includes a cooling channel for the circulation of coolant therethrough to mitigate heat expansion movements of said mounting means.

14. An axial flow gas turbine according to claim 9 in which said housing includes a gas outlet conduit and expansion-compensating packing means for resiliently enclosing said rotor and said stationary guiding components notwithstanding relative heat expansion movements therebetween.

15. An axial flow gas turbine according to claim 9 having a gas inlet conduit for supplying driving gas to said turbine rotor and means for mounting said gas inlet conduit on said main frame for radial and axial expansion movement independently of said supporting ring and said stationary guiding components.

16. An axial flow gas turbine according to claim 15 in which said means for mounting said gas inlet conduit includes a plurality of radially slidable expansion-compensating fastenings at the periphery of said inlet conduit adjacent one end only thereof for radial and axial expansion movement of said conduit with respect to said main frame.

17. An axial flow gas turbine according to claim 9 in which said means for rotatably mounting said rotor on said supporting ring includes a shaft for said rotor, a bearing for said shaft adjacent said rotor, and a conical flange for supporting said bearing coaxially on said supporting ring.

18. In an axial flow gas turbine adapted for high temperature operation free of thermally induced interference and misalignment of moving and stationary components therein, the combination which comprises a main frame for said turbine, a bladed turbine rotor, means for rotatably mounting said rotor on said main frame, stationary guiding components for guiding the flow of driving gas about said rotor and adapted for close clearance working association therewith, a supporting ring for carrying said stationary guiding components, means for mounting said supporting ring on said main frame separately of said rotor mounting means with said guiding components disposed coaxially of said rotor, housing means for said rotor and said stationary guiding components, and means for mounting said housing means on said main frame for radial and axial expansion movement independently of said rotor mounting means and said supporting ring.

19. An axial flow gas turbine according to claim 18 having interfitting lamellar packing means on said housing and said rotor mounting means for resiliently enclosing said rotor in said housing notwithstanding heat expansion movements therebetween.

20. An axial flow gas turbine according to claim 19 in which said packing means between said housing and said rotor include a plurality of lamellar packing rings on said rotor mounting means and a plurality of resilient packing rings on said housing for interfitting engagement with said rings on said rotor mounting means providing a nonrigid gas-tight closure between said housing and said rotor housing means.

21. An axial flow gas turbine according to claim 19 having a shaft for said rotor, packing means around said shaft, a packing socket for enclosing said packing means, and means for mounting said lamellar packing rings on said packing sockets.

22. An axial flow gas turbine according to claim 18 in which said guide blades are supported in a guide blade carrier having a plurality of circumferential segments, said segmented carrier being affixed to said supporting ring.

23. An axial flow gas turbine according to claim 18 having, in addition to said supporting ring for carrying said stationary guiding components, a second supporting ring cooperating with said first mentioned supporting ring for carrying said stationary guiding components, one of said supporting rings being rigidly fixed to said main frame and the other said supporting ring being axially displaceable with respect to said main frame for compensating for axial expansion movements of said stationary guiding components.

24. An axial flow gas turbine according to claim 18 in which said housing means includes inlet and outlet conduits for the driving gas for said turbine.

25. An axial flow gas turbine according to claim 18 having guide means between said frame and said supporting ring for guiding said supporting ring with respect to said frame during radial and axial heat expansion movements thereof and maintaining said supporting ring coaxially aligned with said rotor.

26. An axial flow gas turbine according to claim 18 having resilient sealing means forming a nonrigid gas-tight closure between said housing and said supporting ring for confining driving gas within said housing notwithstanding relative heat expansion movements between said housing and said supporting ring.

27. An axial flow gas turbine according to claim 18 in which said main frame includes hollow channels therethrough for the passage of coolant for controlling the temperature and heat expansion of said frame.

28. An axial flow gas turbine according to claim 18 in which said stationary guiding components include a stationary cover ring disposed concentrically around said rotor and in close clearance working association with the radially outer tips of the turbine blades thereof, said radially outer tips of said turbine blades being beveled in an axial direction and the inner surface of said stationary cover ring being beveled in a complementary direction effecting reduction of clearance between said radially outer blade tips and said cover ring as said rotor and said cover ring undergo axial expansion movements toward each other.

29. In an axial flow gas turbine adapted for high temperature conditions free of thermally induced interference and misalignment of moving and stationary components therein, the combination which comprises a main frame for said turbine, a bladed rotor journaled on said frame, stationary guiding components for guiding the flow of driving gas about said rotor and disposed coaxially around said rotor for close clearance working association therewith, a pair of supporting rings coaxially surrounding said rotor and said stationary guiding components, means for mounting said stationary guiding components on said supporting rings and axially positioned therebetween, means for mounting said supporting rings on said main frame for expansion movement with respect thereto independently of said rotor, housing means for said rotor and said stationary guiding components and including inlet and outlet conduits for conducting said driving gas to and from said rotor, means for mounting said housing means and said inlet and outlet conduits on said main frame for expansion movement independently of said rotor journals and said supporting rings, a cylindrical flange on each of said inlet and outlet conduits, each of said flanges slidably engaging one of said supporting rings for compensating for relative axial heat expansion movement between said conduits and said supporting rings, and packing means around said flanges for gas-sealing engagement against said supporting ring.

30. An axial flow gas turbine according to claim 29 in which said cylindrical flanges and said supporting rings define therebetween a leakage passage and in which said packing means only partially seals against passage of gas between said flanges and said supporting rings providing controlled leakage of a small portion of said driving gas out of said conduits to equalize the temperature of said supporting rings and adjacent turbine components outside said conduits.

References Cited in the file of this patent

UNITED STATES PATENTS

| | | |
|---|---|---|
| 1,873,743 | Doran | Aug. 23, 1932 |
| 1,884,422 | Walbridge | Oct. 25, 1932 |
| 2,591,399 | Buckland et al. | Apr. 1, 1952 |
| 2,781,999 | Brennecke | Feb. 19, 1957 |
| 2,845,249 | Taylor et al. | July 29, 1958 |

FOREIGN PATENTS

| | | |
|---|---|---|
| 486,340 | Great Britain | June 2, 1938 |
| 704,334 | Great Britain | Feb. 17, 1954 |
| 711,463 | Great Britain | July 7, 1954 |
| 726,072 | Great Britain | Mar. 16, 1955 |
| 852,247 | Germany | Oct. 13, 1952 |
| 950,556 | France | Sept. 30, 1949 |